3 Sheets—Sheet 1.
A. F. MILLER & R. E. GROSS.
Apparatus for Rendering Fat.
No. 229,446. Patented June 29, 1880.
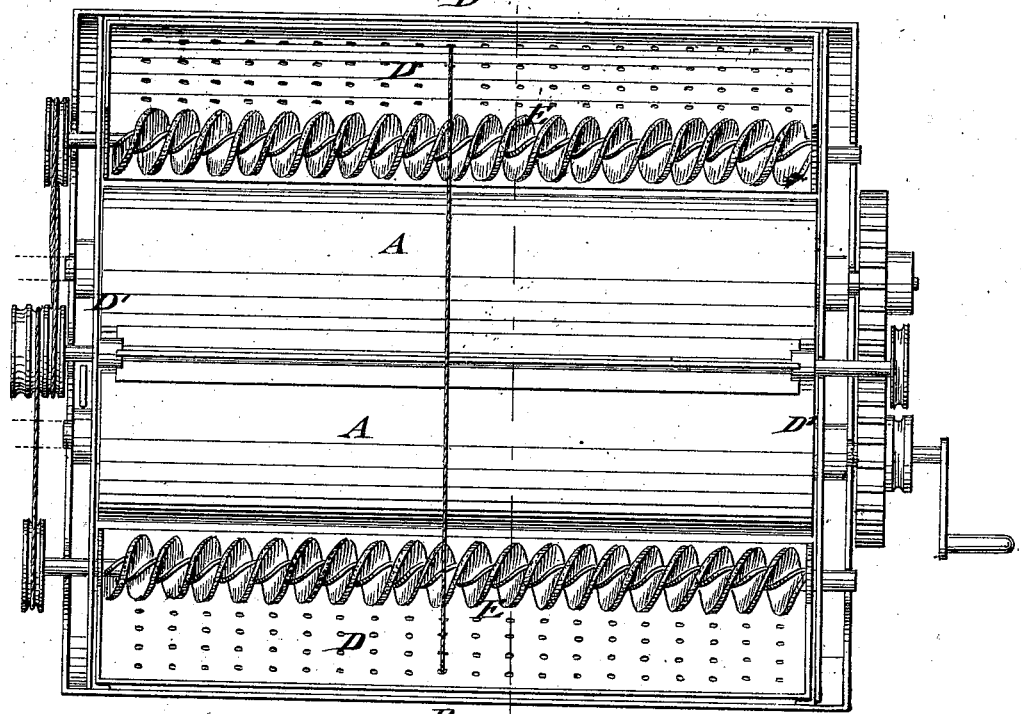
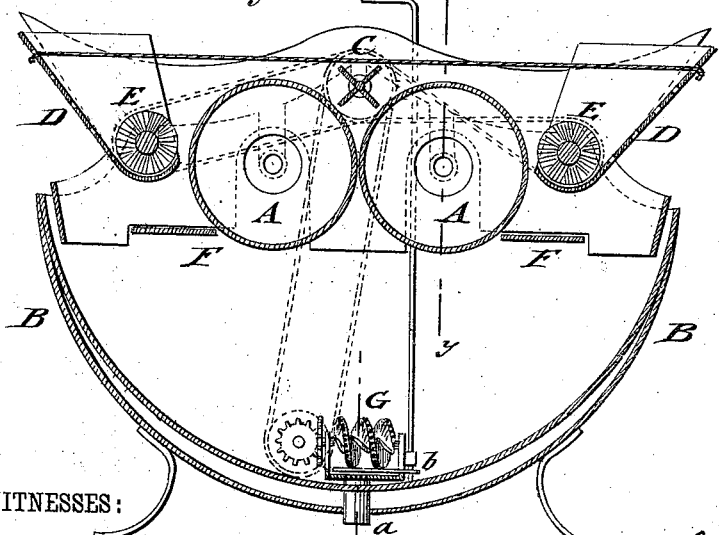
WITNESSES:
INVENTOR
Asa F. Miller
and Robert E. Gross
By Paul Goepel
ATTORNEY 3 Sheets—Sheet 2.

A. F. MILLER & R. E. GROSS.
Apparatus for Rendering Fat.

No. 229,446. Patented June 29, 1880.

WITNESSES:
Carl Karp
Gustav J. Ehmann

INVENTOR
Asa F. Miller
and Robert E. Gross
By Paul Goepel
ATTORNEY

3 Sheets—Sheet 3.

A. F. MILLER & R. E. GROSS.
Apparatus for Rendering Fat.

No. 229,446. Patented June 29, 1880.

WITNESSES:
Carl Karp
Otto Risch

INVENTOR
Asa F. Miller
George E. Gross
BY Paul Goepel
ATTORNEY

UNITED STATES PATENT OFFICE.

ASA F. MILLER AND ROBERT E. GROSS, OF NEW YORK, N. Y.; SAID GROSS ASSIGNOR TO SAID MILLER.

APPARATUS FOR RENDERING FAT.

SPECIFICATION forming part of Letters Patent No. 229,446, dated June 29, 1880.

Application filed February 16, 1880.

*To all whom it may concern:*

Be it known that we, ASA F. MILLER and ROBERT E. GROSS, both of the city, county, and State of New York, have invented certain new and useful Improvements in Apparatus for Rendering Fat, of which the following is a specification.

This invention has reference to an improved apparatus for rendering animal or other fats for the purpose of obtaining a pure and clear oil, which is to be used in the manufacture of artificial butter, the apparatus being so constructed as to extract the oil from the hashed animal tissues in a rapid and economical manner, to be clarified after rendering, so that finally a sweet and odorless oil is obtained which is capable of transportation to any climate without being affected to any degree by changes of temperature.

The invention consists of rotary cylinders provided with hollow journals for admitting steam, of a revolving agitator above the cylinders, of rotary side brushes, of an inclosing-hopper having adjustable perforated side walls, and of a steam-jacketed oil-receiver, in which the oil is collected for final cooking, together with mechanism for operating the parts, as will be more fully described hereinafter, and finally pointed out in the claims.

Figure 3:
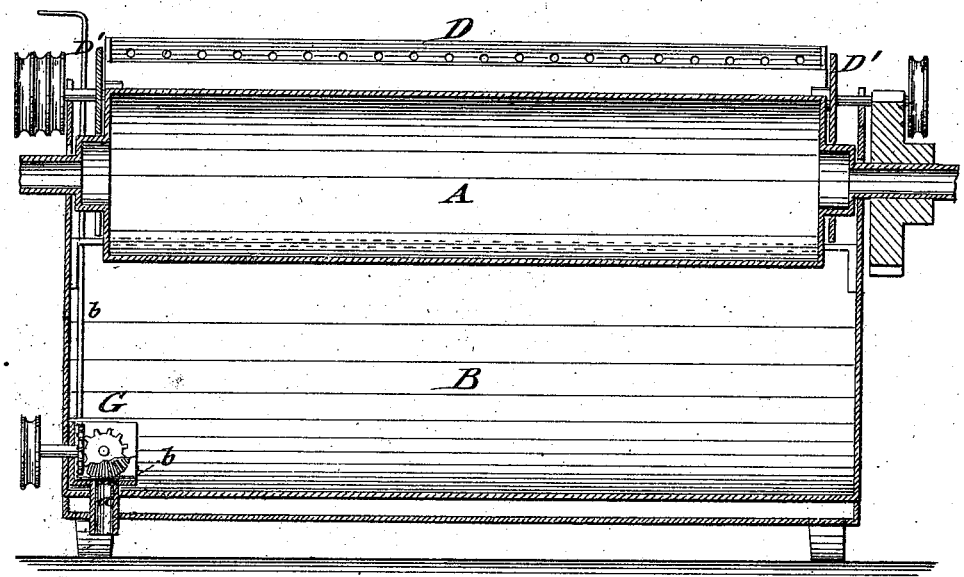
Figure 4:
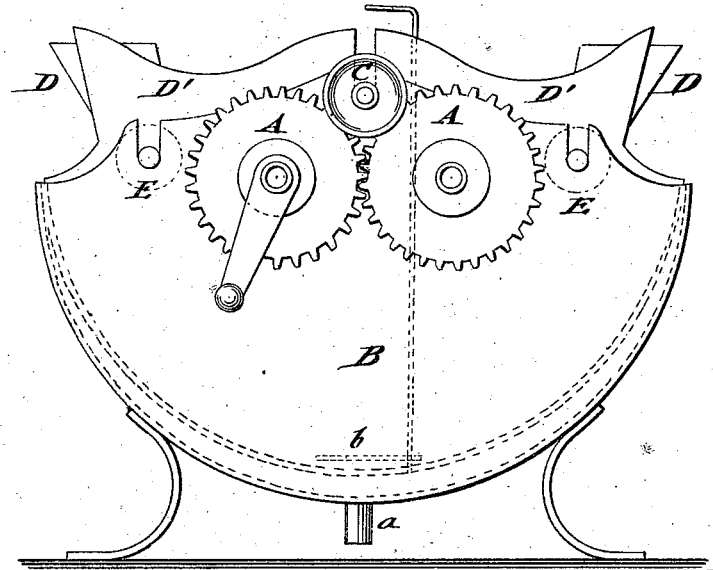
Figure 5:
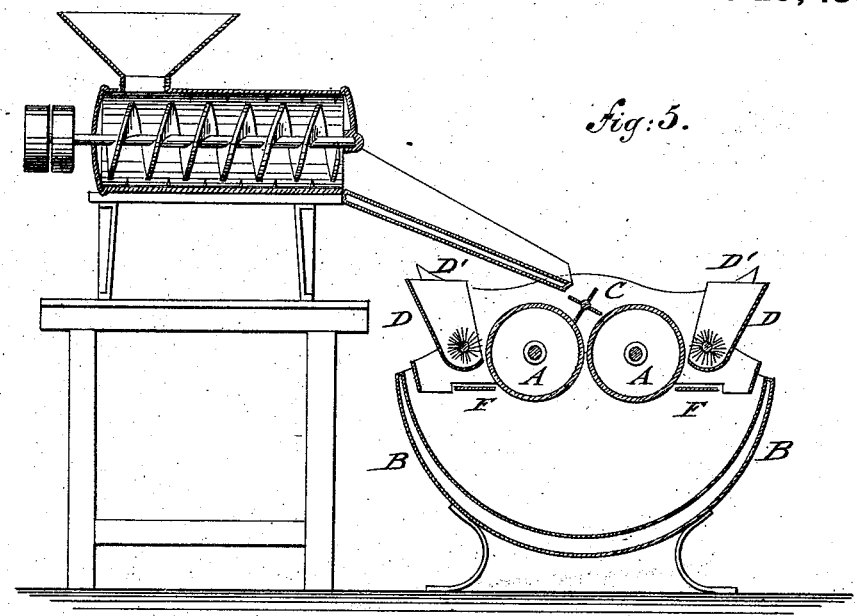
Figure 6:
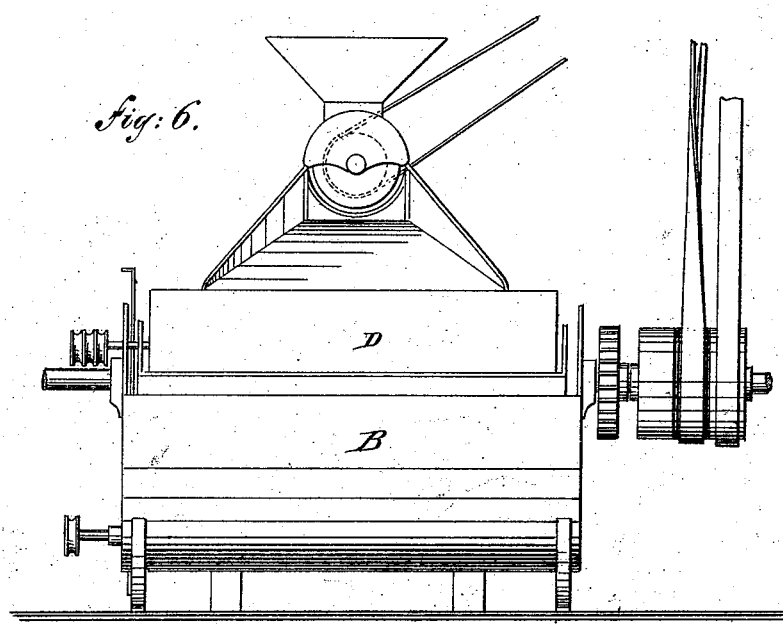

In the accompanying drawings, Figure 1 represents a top view, Fig. 2 a vertical transverse section on line $x\ x$, Fig. 1, Fig. 3 a vertical longitudinal section on line $y\ y$, Fig. 2, and Fig. 4 an end view, of our apparatus for rendering fat. Fig. 5 is a vertical transverse section of the apparatus for rendering fat and of one of the hashers; and Fig. 6 is a side view of the apparatus for rendering fat, showing the reversing mechanism for the steam-heated cylinders.

Similar letters of reference indicate corresponding parts.

A A in the drawings represent two hollow cylinders, of suitable size and of sufficient strength to sustain a steam-pressure of at least one hundred pounds to the square inch. The cylinders are revolved by intermeshing cog-wheels which receive their motion by a belt and pulley from a transmitting-shaft, the hollow shafts of the cylinders turning in bearings of the end walls of a steam-jacketed oil-receiver, B, of semi-cylindrical shape.

The hollow revolving cylinders A A are supplied through their hollow shafts with steam or superheated steam, provision being made for drawing off the water of condensation, so that the cylinders are kept at a uniformly high temperature.

By a suitable belt-shifting arrangement and intermeshing gearing (shown in Figs. 4 and 6) the cylinders may be revolved in opposite directions, or toward each other, they being placed close enough so as to form contact with each other.

In the upper triangular space between the cylinders A A is arranged a revolving agitator, C, upon which the fat is delivered from the hoppers or chutes of the hashers, as shown in Fig. 5, said hoppers being heated by steam, so as to secure a rapid and uniform delivery of the hashed fat to the rendering apparatus. The agitator transfers the fat to the surface of the revolving cylinders, the heat of which causes the fat to melt, so that the oil is separated from the membrane or animal tissues, and then strained off through the perforations of inclined side walls, D, arranged in the shape of a hopper, at both sides of the cylinders.

In the angular spaces formed between the cylinders and the hopper-walls are placed revolving brushes E, of metal or other material, which serve to brush the heated fat upon the cylinders as well as to disintegrate the lumpy mass delivered by the hashers. The brushes are revolved by gear-wheels which mesh with the gear-wheels of the heated cylinders, which are turned, during the first part of the operation, in opposite directions to each other, while the brushes revolve toward the same.

The hopper-walls D D are pivoted to transverse end walls, D' D', and provided with inwardly-turned end plates or wings, so that the oil cannot escape between the side and end walls. The hopper-walls D D are transversely connected by chains, cords, or otherwise, so as to be raised or lowered, as required. When the hopper has become charged to its full capacity with scrap or cracklings from which the oil has been drained off to the receiver, the hashing is suspended, but the motion of the cylinders, agitator, and brushes continued until all the fat has passed over the surface of the heated cylinders and has been exposed to the action of the same. The belt is then shifted and the motion of the cylinders reversed, so that they revolve toward each other, thereby taking up the scrap and cracklings and pressing out the oil which is still contained in the same. The hopper-walls are then raised nearly to a vertical position, so as to transfer all the scrap upon the cylinders, which press out all the oil and transfer it into the oil-receiver, where it is again cooked, and then drawn off.

The cylinders are cleaned of the adhering scrap by means of scrapers F, arranged at the lower part of the same.

The operation of pressing the scrap is quickly accomplished, it requiring only a limited period of time—say about ten minutes. The oil extracted from the fat and pressed out of the scrap is collected in the receiver, and there thoroughly cooked, so as to form a homogeneous mass, which is then drawn off by opening a valve of the discharge-orifice of the receiver. The pressed scrap, being thus transferred to and deposited below the scrapers in the receiver, is then removed, the apparatus being stopped for this purpose.

The object of the pressing of the scrap and of the second heating of the oil expressed therefrom is to extract any partially-eliminated or non-rendered oil, which otherwise remains in the scrap, owing to the rapid rendering produced by the radiating-surface of the revolving cylinders. The percentage of oil rendered from the fat is thereby considerably increased, while the exposure of the oil to the second radiating-surface of the receiver raises it to a higher temperature and produces a purer and superior product.

The increased yield of oil and the more thorough cooking of the oil form the most important feature of our invention.

During the cooking of the oil collected in the receiver no part of the same is allowed to pass off through the discharge-orifice a at the lowermost part of the oil-receiver, it being kept closed by a valve, stop-cock, or other device, b. As soon as the oil has been thoroughly cooked in the oil-receiver the valve is opened and the oil drawn off through conveyers or pipes to the clarifying-vessels, a strainer being placed over the discharge-orifice, which strainer is kept clear of scrap by a revolving brush, G.

The revolving motion of the brush is imparted by a transmitting-gear, the shaft of one gear-wheel of which is passed through a stuffing-box of the end wall of the oil-receiver to the outside, where it is connected by a pulley and belt to the driving-shaft. As soon as the oil is all drawn off from the receiver into the clarifying vessel or vessels the receiver is cleaned of the scraps and cracklings, the hashers are started again, the revolving cylinders are reversed, and the supply of hashed fat continued until the apparatus is fully charged, as before described. The motion of the cylinders is then again reversed, the scrap pressed, and the oil thoroughly cooked in the oil-receiver, and then drawn off.

It will be observed that by our process and apparatus the oil is not immediately drawn off and continuously conveyed away from the heat and the animal tissues, but retained for a sufficient length of time in the apparatus to be thoroughly cooked. The exposure of the fat to the extracting heat of the cylinders, together with the pressing out the scrap, extracts all the oil contained in the fat, so that a more advantageous rendering of the fat, as compared to the continuous processes at present in use, is the result.

Having thus described our invention, we claim as new and desire to secure by Letters Patent—

1. In an apparatus for rendering fat, the combination of rotary cylinders provided with hollow journals for admitting steam, an agitator located above the cylinders, rotary side brushes, and mechanism for revolving the said cylinders, agitator, and brushes, as shown and described.

2. In an apparatus for rendering fat, the combination of rotary cylinders provided with hollow journals for admitting steam, rotary side brushes, mechanism for revolving said cylinders and brushes, and an inclosing-hopper having adjustable perforated side walls, substantially as described.

3. In an apparatus for rendering fat, the combination of rotary cylinders provided with hollow journals for admitting steam, an agitator located above the cylinders, rotary side brushes, and a hopper with perforated walls, with a steam-jacketed oil-receiver, in which the oil is collected for final cooking, as set forth.

In testimony that we claim the foregoing as our invention we have signed our names, in presence of two witnesses, this 2d day of February, 1880.

ASA F. MILLER.
ROBERT E. GROSS.

Witnesses:
PAUL GOEPEL,
CARL KAEP.